(12) United States Patent
Li et al.

(10) Patent No.: US 6,646,039 B2
(45) Date of Patent: Nov. 11, 2003

(54) HYDROSILYATION CURED SILICONE RESIN CONTAINING COLLOIDAL SILICA AND A PROCESS FOR PRODUCING THE SAME

(75) Inventors: Zhongtao Li, Midland, MI (US); Frederick J. McGarry, Weston, MA (US); Dimitris E. Katsoulis, Tokyo (JP); John R. Keryk, Midland, MI (US); Debora F. Bergstrom, Midland, MI (US); Kermit S. Kwan, Midland, MI (US); Bizhong Zhu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 27 days.

(21) Appl. No.: 10/091,685

(22) Filed: Mar. 5, 2002

(65) Prior Publication Data

US 2003/0171476 A1 Sep. 11, 2003

(51) Int. Cl.$^7$ .............................. C08K 3/36; C08G 77/06
(52) U.S. Cl. .......................... 524/492; 524/588; 528/15; 528/25; 528/31; 528/32
(58) Field of Search ............................... 528/15, 25, 31, 528/32; 524/588, 492

(56) References Cited

U.S. PATENT DOCUMENTS

| | | | | |
|---|---|---|---|---|
| 5,178,947 A | * | 1/1993 | Charmot et al. | 428/405 |
| 5,623,030 A | * | 4/1997 | Tsumura et al. | 525/478 |
| 5,981,670 A | * | 11/1999 | Itoh et al. | 525/478 |
| 6,252,030 B1 | * | 6/2001 | Zank et al. | 528/31 |

FOREIGN PATENT DOCUMENTS

| | | | | |
|---|---|---|---|---|
| EP | 1065248 A1 | * | 1/2001 | C08L/83/04 |

* cited by examiner

Primary Examiner—Robert Dawson
Assistant Examiner—Marc S. Zimmer
(74) Attorney, Agent, or Firm—Clark Hill PLC

(57) ABSTRACT

A hydrosilylation reaction curable composition including a silsesquioxane polymer, a cross-linking compound, a hydrosilylation reaction catalyst and colloidal silica having a surface coating formed thereon. The curable composition is cured to form a cured resin having high fracture toughness and strength without the loss of elastic modulus and glass transition temperature.

33 Claims, No Drawings

HYDROSILYATION CURED SILICONE RESIN CONTAINING COLLOIDAL SILICA AND A PROCESS FOR PRODUCING THE SAME

FIELD OF THE INVENTION

The invention relates to a process for producing a cured silsesquioxane resin having high fracture toughness and strength without loss of elastic modulus and glass transition temperature. With more particularity the invention relates to a cured silsequioxane resin having colloidal silica having a surface coating formed thereon dispersed within the silsesquioxane resin.

BACKGROUND OF THE INVENTION

Silsesquioxane resins have seen increased use in industrial applications in the automotive, aerospace, naval and other manufacturing industries. Silsequioxane resins exhibit excellent heat and fire resistant properties that are desirable for such applications. These properties make the silsesquioxane resins attractive for use in fiber-reinforced composites for electrical laminates, structural use in automotive components, aircraft and naval vessels; Thus, there exists a need for rigid silsesquioxane resins having increased flexural strength, flexural strain, fracture toughness, and fracture energy, without significant loss of modulus or degradation of thermal stability. In addition, rigid silsesquioxane resins have low dielectric constants and are useful as interlayer dielectric materials. Rigid silsesquioxane resins are also useful as abrasion resistant coatings. These applications require that the silsesquioxane resins exhibit high strength and toughness.

Conventional thermoset networks of high cross-link density, such as silsesquioxane resins, typically suffer from the drawback that when measures are taken to improve a mechanical property such as strength, fracture toughness, or modulus, one or more of the other properties suffers a detriment.

Various methods and compositions have been disclosed in the art for improving the mechanical properties of silicone resins including: 1) modifying the silicone resin with a rubber compound, as disclosed in U.S. Pat. No. 5,747,608 which describes a rubber-modified resin and U.S. Pat. No. 5,830,950 which describes a method of making the rubber-modified resin; 2) adding a silicone fluid to a silicone resin as disclosed in U.S. Pat. No. 5,034,061 wherein a silicone resin/fluid polymer is adapted to form a transparent, shatter-resistant coating.

While the above referenced patents offer improvements in the strength of silicone resins, there is an additional need to further improve the strength and toughness of silicone materials for use in high strength applications, such as those described above. There is also a strong need to further increase the strength, toughness, modulus and to raise the glass transition temperature simultaneously.

Therefore, it is an object of this invention to provide a process that may be utilized to prepare a cured silsesquioxane resin having high strength and fracture toughness without loss of modulus and glass transition temperature. It is also an object of the invention to provide a process to prepare a cured silsesquioxane resin having simultaneously increased strength, toughness, modulus with an increased glass transition temperature.

SUMMARY OF THE INVENTION

A hydrosilylation reaction curable composition including a silsesquioxane polymer, a cross-linking compound, a hydrosilylation reaction catalyst and colloidal silica having a surface coating formed thereon.

There is also included a process for preparing a hydrosilylation reaction curable composition and producing a cured silsesquioxane resin comprising the steps of:
a) providing a silsesquioxane polymer;
b) providing a cross-linking compound;
c) providing colloidal silica with a surface treatment formed thereon;
d) mixing the components of a), b), c) to form a curable composition;
e) adding a hydrosilylation reaction catalyst to the curable composition of step d)
f) curing the curable composition of step e) to form a cured resin having high fracture toughness and strength without the loss of elastic modulus and glass transition temperature.

DETAILED DESCRIPTION OF THE PREFERRED EMBODIMENTS

This invention relates to a hydrosilylation reaction curable composition and process that is used to prepare a cured silsesquioxane resin. This curable composition comprises: (A) a silsesquioxane copolymer, (B) a silicon hydride containing hydrocarbon, silane or siloxane as a crosslinker, (C) a catalyst, (D) an optional solvent (E) a catalyst inhibitor and (F) colloidal silica having a surface coating of various compositions formed thereon.

Component (A) is a silsesquioxane copolymer comprising units that have the empirical formula $R^1_a R^2_b R^3_c SiO_{(4-a-b-c)/2}$, wherein: a is zero or a positive number, b is zero or a positive number, c is zero or a positive number, with the provisos that $0.8 \leq (a+b+c) \leq 3.0$ and component (A) has an average of at least 2 $R^1$ groups per molecule, and each $R^1$ is independently selected from monovalent hydrocarbon groups having aliphatic unsaturation, and each $R^2$ and each $R^3$ are independently selected from monovalent hydrocarbon groups and hydrogen. Preferably, $R^1$ is an alkenyl group such as vinyl or allyl. Typically, $R^2$ and $R^3$ are nonfunctional groups selected from the group consisting of alkyl and aryl groups. Suitable alkyl groups. include methyl, ethyl, isopropyl, n-butyl, and isobutyl groups. Suitable aryl groups include phenyl groups. Suitable silsesquioxane copolymers for component (A) are exemplified by $(PhSiO_{3/2})_{0.75}(ViMe_2SiO_{1/2})_{0.25}$, where Ph is a phenyl group, Vi represents a vinyl group, and Me represents a methyl group.

Component (B) is a silicon hydride containing hydrocarbon having the general formula $H_a R^1_b SiR^2 SiR^1_c H_d$ where $R^1$ is a monovalent hydrocarbon group and $R^2$ is a divalent hydrocarbon group and where a and $d \geq 1$, and $a+b=c+d=3$. The general formula $H_a R^1_b SiR^2 SiR^1_c H_d$ although preferred in the present invention is not exclusive of other hydrido silyl compounds that can function as cross-linkers of the component (A). Specifically a formula such as the above, but where $R^2$ is a trivalent hydrocarbon group can also be suitable as component (B). Other options for component (B) can be mixtures of hydrido-silyl compounds as well.

Suitable silicon hydride containing hydrocarbons of component (B) can be prepared by a Grignard reaction process. For example, one method for making a silyl-terminated hydrocarbon for use in this invention includes heating to a temperature of room temperature to 200° C., preferably 50° C., a combination of magnesium and a solvent such as diethylether or tetrahydrofuran. A di-halogenated hydrocarbon, such as dibromobenzene is then added to the magnesium and solvent over a period of several hours.

After complete addition of the di-halogenated hydrocarbon, a halogenated silane, such as dimethylhydrogenchlorosilane, is then added, and an optional organic solvent can also be added. The resulting mixture is then heated for a period of several hours at a temperature of 50 to 65° C. Any excess halogenated silane is then removed by any convenient means, such as neutralization with a saturated aqueous solution of $NH_4Cl$. The resulting product can then be dried with a drying agent such as magnesium sulfate and then purified by distillation.

An example of such a silicon hydride containing hydrocarbon produced by a Grignard reaction includes p-bis (dimethylsilyl)benzene which is commercially available from Gelest, Inc. of Tullytown, Pa.

Component (B) may also be a silane or siloxane that contain silicon hydride functionalities that will cross-link with the vinyl group of component (A). Examples of suitable silanes and siloxanes that may be utilized as component (B) include di phenylsilane and hexamethyltrisiloxane. Such compounds are commercially available from Gelast, Inc. of Tullytown, Pa. and United Chemical Technologies of Bristol, Pa. Component (B) can also be mixtures of hydrido containing silane and siloxanes.

Components (A) and (B) are added to the composition in amounts such that the molar ratio of silicon bonded hydrogen atoms (SiH) to unsaturated groups (C=C) (SiH:C=C) ranges from 1.0:1.0 to 1.5:1.0. Preferably, the ratio is in the range of 1.1:1.0 to 1.5:1.0. If the ratio is less than 1.0:1.0, the properties of the cured silsesquioxane resin will be compromised because curing will be incomplete. The amounts of components (A) and (B) in the composition will depend on the number of C=C and Si—H groups per molecule. However, the amount of component (A) is typically 50 to 80 weight % of the composition, and the amount of component (B) is typically 2 to 50 weight % of the composition.

Component (C) is a hydrosilylation reaction catalyst. Typically, component (C) is a platinum catalyst added to the composition in an amount sufficient to provide 1 to 10 ppm of platinum based on the weight of the composition. Component (C) is exemplified by platinum catalysts such as chloroplatinic acid, alcohol solutions of chloroplatinic acid, dichlorobis(triphenylphosphine)platinum(II), platinum chloride, platinum oxide, complexes of platinum compounds with unsaturated organic compounds such as olefins, complexes of platinum compounds with organosiloxanes containing unsaturated hydrocarbon groups, such as Karstedts catalyst (i.e. a complex of chloroplatinic acid with 1,3-divinyl-1,1,3,3-tetramethyldisiloxane) and 1,3-diethenyl-1,1,3,3-tetramethyldisiloxane, and complexes of platinum compounds with organosiloxanes, wherein the complexes are embedded in organosiloxane resins. A particularly preferred catalyst is a 0.5% platinum containing platinum-divinyltetramethyldisiloxane complex commercially available from Dow Corning Corporation of Midland, Mich.

Component (D) may include an optional catalyst inhibitor, typically added when a one part composition is prepared. Suitable inhibitors are disclosed in U.S. Pat. No. 3,445,420 to Kookootsedes et al., May 20, 1969, which is hereby incorporated by reference for the purpose of describing catalyst inhibitors. Component (D) is preferably an acetylenic alcohol such as methylbutynol or ethynyl cyclohexanol. Component (D) is more preferably ethynyl cyclohexanol. Other examples of inhibitors include diethyl maleate, diethyl fumamate, bis(2-methoxy-1-methylethyl) maleate, 1-ethynyl-1-cyclohexanol, 3,5-dimethyl-1-hexyn-3-ol, 2-phenyl-3-butyn-2-ol, N,N,N',N'-tetramethylethylenediamine, ethylenediamine, diphenylphosphine, diphenylphosphite, trioctylphosphine, diethylphenylphosphonite, and methyldiphenylphosphinite.

Component (D) is present at 0 to 0.05 weight % of the hydrosilylation reaction curable composition. Component (D) typically represents 0.0001 to 0.05 weight % of the curable composition. Component (D) preferably represents 0.0005 to 0.01 weight percent of the total amount of the curable composition. Component (D) more preferably represents 0.001 to 0.004 weight percent of the total amount of the curable composition.

Components (A), (B), (C) and (D) comprise 10 to 99.9 weight % of the composition. The composition may further comprise one or more optional components such as processing additives or other components known in the art.

The hydrosilylation reaction curable composition comprising components (A), (B), (C) and (D), and any optional components can be dissolved in component (E), an optional solvent. Typically, the amount of solvent is 0 to 90 weight %, preferably 0 to 50 weight % of the curable composition. The solvent can be an alcohol such as methyl, ethyl, isopropyl, and t-butyl alcohol; a ketone such as acetone, methylethyl ketone, and methyl isobutyl ketone; an aromatic hydrocarbon such as benzene, toluene, and xylene; an aliphatic hydrocarbon such as heptane, hexane, and octane; a glycol ether such as propylene glycol methyl ether, dipropylene glycol methyl ether, propylene glycol n-butyl ether, propylene glycol n-propyl ether, and ethylene glycol n-butyl ether; a halogenated hydrocarbon such as dichloromethane, 1,1,1-trichloroethane and methylene chloride; chloroform; dimethyl sulfoxide; dimethyl formamide; acetonitrile and tetrahydrofuran. A preferred solvent is toluene.

The hydrosilylation reaction curable composition further includes component (F), colloidal silica with a surface coating formed thereon. The colloidal silica may comprise from 0.1 to 90 weight percent of the reaction curable composition and is preferably from 20 to 80 weight percent of the reaction curable composition and even more preferably from 5 to 25 weight percent of the reaction curable composition.

The colloidal silica particles may range in size from 5 to 150 nanometers in diameter, with a particularly preferred size of 75 nanometers.

The colloidal silica particles are treated with a surface coating by reacting a siloxane or mixture of siloxanes with the silica particle such that silyl groups are formed on the surface of the silica particle. Suitable reactive silanes or siloxanes can include functionalities such as: vinyl, hydride, allyl, aryl or other unsaturated groups. Particularly preferred siloxanes for use as a surface coating include hexamethyldisiloxane and tetramethyldivinyldisiloxane.

The surface coated silica particles may be formed by mixing silica particles with deionized water to form a solution and then adding concentrated hydrochloric acid, isopropyl alcohol, and a siloxane or mixture of siloxanes. The above mixture is then heated to 70° C. and is allowed to stir for 30 min. As the hydrophilic silica becomes hydrophobic due to the silylation of silica surface silanols, the silica phase separates from the aqueous phase. No excess organic solvent is required to induce phase separation, as is often the case. Once separation occurs, the aqueous layer (isopropyl alcohol, water, excess treating agent and HCl) is decanted. Deionized water is added to the decanted mixture to wash the treated silica. This step may be repeated a second time to insure adequate washing. To the washed silica solution, a solvent is added and the mixture is heated to reflux to azeotrope residual water and water-soluble reagents.

There is also disclosed a process for preparing a hydrosilyation reaction curable composition comprising the steps of:

a) providing a silsesquioxane polymer;

b) providing a cross-linking compound;

c) providing colloidal silica with a surface treatment formed thereon;

d) mixing the components of a), b), c) to form a curable composition;

e) adding a hydrosilylation reaction catalyst to the curable composition of step d)

f) adding an optional reaction inhibitor to the catalyst of step e) before or after mixing the reaction catalyst with the curable composition;

g) curing the curable composition of step e) to form a cured resin having high fracture toughness and strength without the loss of elastic modulus and glass transition temperature.

The silsesquioxane polymer, as described previously, is first mixed with the cross-linking compound, as disclosed above, and then the colloidal silica having the surface treatment is added. Either a conventional mixer or a high shear rotor/stator mixer may be utilized by the present invention, although a rotor/stator mixer is preferred due to the increased dispersion of the silica particles in the composition, leading to an increase in the mechanical properties of the cured resin. After the components above are mixed, the hydrosilylation catalyst is mixed into the composition and the mixture is poured into a mold. The mixing of the curable composition of the present invention may also include the step of degassing the composition before curing. Degassing is typically carried out by subjecting the composition to a mild vacuum.

The mold is then subjected to the following curing steps: 1) leaving the curable composition of step f) in a mold at room temperature overnight, 2) curing the curable composition in the mold at a temperature of 60° C. for 6 hours, 3) curing the curable composition in the mold at a temperature of 100° C. for 2 hours, 4) curing the curable composition in the mold at a temperature of 160° C. for 2 hours, 5) curing the curable composition in the mold at a temperature of 200° C. for 3 hours, 6) curing the curable composition in the mold at a temperature of 260° C. for 6 hours.

EXAMPLES

The following examples are intended to illustrate the invention to those skilled in the art and should not be interpreted as limiting the scope of the invention as set forth in the appended claims.

Reference Example 1

75 nm colloidal silica treated with hexamethyl disiloxane $(Me_3Si)_2O$ and dispersed in a toluene solution.

An amount of 388.1 ml of a 40% by weight colloidal silica solution [Nalco 2329®, diameter 75 nm; specific gravity, 1.29 g/ml; surface area, 40 $m^2$/gr] was mixed with 862 ml of deionized water to make a 1250 ml mixture. In a 5-liter flask, 500 ml concentrated HCl, 25.0 ml water, 600 ml isopropyl alcohol and 213.4 ml hexamethyldisiloxane, $[(Me_3SiO)_2]$, were added and mixed well. To the resulted 1338 ml solution, the colloidal silica-water mixture was added as a fine stream with good mixing. The mixture was heated to 70° C. and then was allowed to stir for 30 min. As the hydrophilic silica became hydrophobic due to the silylation of silica surface silanols, the silica phase separated from the aqueous phase. No excess organic solvent was required to induce phase separation, as is often the case. Once separation occurred, the aqueous layer (isopropyl alcohol, water, excess treating agent and HCl) was decanted. An amount of 500 ml deionized water was added into the flask to wash the treated silica and was decanted. This step was repeated a second time to insure adequate washing. To the washed silica solution, approximately 1250 ml toluene were added, a Dean Stark trap and condenser were attached and the mixture heated to reflux to azeotrope residual water and water-soluble reagents. The washing step is utilized to remove as much of the HCl, IPA, water, and excess treating agent as possible, thereby shortening the time necessary for this reflux/azeotroping step. This removal also minimizes the potential for any side reactions that may occur during this reflux step due to the presence of residual acid.

The result is a non-aggregated silyl-treated 75 nm colloidal silica-toluene mixture. The silica was characterized by cleaving off the silica silyl groups in the presence of tetraethyl orthosilicate (TEOS) and a strong base (i.e., "digestion" process). The amount and type of the surface silyl groups in the digested solution were quantified via gas chromatography and a flame ionization detector (GC-FID). Surface analysis of this silica-toluene mixture described a particle with 1.38 weight % of trimethyl silyl groups. Based upon theoretical calculations, this treatment amount is approximated as 45874 trimethyl silyl groups per particle and/or 2.60 trimethyl silyl groups per $nm^2$ of silica surface area. This is representative of approximately 100% theoretical coverage of the silica surface silanols by silyl groups. The material was used as an additive for in silicone matrices to increase their mechanical properties (as shown in examples that follow).

Reference Example 2

75 nm colloidal silica treated with hexamethyl disiloxane $(Me_3Si)_2O$ and low levels of tetramethyldivinyl disiloxanes $(Me_2ViSi)_2O$ and dispersed in toluene solution.

An amount of 679.1 ml of a 40% by weight colloidal silica solution [Nalco 2329®, diameter 75 nm; specific gravity, 1.29 g/ml; surface area, 40 $m^2$/gr] was mixed with 1508 ml of deionized water to make a 2188 ml mixture. In a 5-liter flask, 873 ml concentrated HCl, 43.8 ml water, 1050 ml isopropyl alcohol and 311.1 ml hexamethyldisiloxane, $[(Me_3Si)_2O]$, and 67.1 ml tetramethyldivinyldisiloxane $[(Me_2ViSi)_2O]$ were added and mixed well. The mole ratio of tetramethyldivinyldisiloxane, $[(Me_2ViSi)_2O]$, to hexamethyldisiloxane, $[(Me_3Si)_2O]$, was 0.2. To the resulted 2345 ml solution, the colloidal silica-water mixture was added as a fine stream with good mixing. The mixture was heated to 70° C. and then was allowed to stir for 30 min. As the hydrophilic silica became hydrophobic due to the silylation of silica surface silanols, the silica phase separated from the aqueous phase. No excess organic solvent was required to induce phase separation, as is often the case. Once separation occurred, the aqueous layer (isopropyl alcohol, water, excess treating agent and HCl) was decanted. An amount of 875 ml deionized water was added into the flask to wash the treated silica and was decanted off. This step was repeated a second time to insure adequate washing. To the washed silica solution, approximately 2188 ml toluene were added, a Dean Stark trap and condenser were attached and the mixture heated to reflux to azeotrope residual water and water-soluble reagents. The washing step is utilized to remove as much of the HCl, IPA, water, and excess treating agent as possible, thereby shortening the time necessary for this reflux/azeotroping step. This removal also minimizes the potential for any side reactions that may occur during this reflux step due to the presence of residual acid.

The result is a non-aggregated silyl-treated 75 nm colloidal silica-toluene mixture. The silica was characterized by cleaving off the silica silyl groups in the presence of tetraethyl orthosilicate (TEOS) and a strong base (i.e., "digestion" process). The amount and type of the surface silyl groups in the digested solution were quantified via gas chromatography and a flame ionization detector (GC-FID). Surface analysis of this silica-toluene mixture described a particle with 1.35 weight % of trimethyl silyl groups and 0.25 weight % of dimethylvinyl silyl groups. Based upon theoretical calculations, this treatment amount is approximated as 44991 trimethyl- and 6677 dimethylvinyl-silyl groups per particle and/or 2.55 trimethyl- and 0.38 dimethylvinyl-silyl groups per nm$^2$ of silica surface area. These values are representative of approximately 100% theoretical coverage of the silica surface silanol groups by silyl groups. The material was used as an additive for in silicone matrices to increase their mechanical properties (as shown in examples that follow).

Reference Example 3

75 nm colloidal silica treated with hexamethyl disiloxane (Me$_3$Si)$_2$O and high levels of tetramethyldivinyl disiloxanes (Me$_2$ViSi)$_2$O and dispersed in toluene solution.

An amount of 388.1 ml of a 40% by weight colloidal silica solution [Nalco 2329®, diameter 75 nm; specific gravity, 1.29 g/ml; surface area, 40 m$^2$/gr] was mixed with 862 ml of deionized water to make a 1250 ml mixture. In a 5-liter flask, 500 ml concentrated HCl, 25.0 ml water, 600 ml isopropyl alcohol and 112.3 ml hexamethyldisiloxane, [(Me$_3$Si)$_2$O], and 108.9 ml tetramethyldivinyldisiloxane [(Me$_2$ViSi)$_2$O] were added and mixed well. The mole ratio of tetramethyldivinyldisiloxane, [(Me$_2$ViSi)$_2$O], to hexamethyldisiloxane, [(Me$_3$Si)$_2$O], was 0.9. To the resulted 1346 ml solution, the colloidal silica-water mixture was added as a fine stream with good mixing. The mixture was heated to 70° C. and then was allowed to stir for 30 min. As the hydrophilic silica became hydrophobic due to the silylation of silica surface silanols, the silica phase separated from the aqueous phase. No excess organic solvent was required to induce phase separation, as is often the case. Once separation occurred, the aqueous layer (isopropyl alcohol, water, excess treating agent and HCl) was decanted. An amount of 500 ml deionized water was added into the flask to wash the treated silica and was decanted off. This step was repeated a second time to insure adequate washing. To the washed silica solution, approximately 1250 ml toluene were added, a Dean Stark trap and condenser were attached and the mixture heated to reflux to azeotrope residual water and water-soluble reagents. The washing step is utilized to remove as much of the HCl, IPA, water, and excess treating agent as possible, thereby shortening the time necessary for this reflux/azeotroping step. This removal also minimizes the potential for any side reactions that may occur during this reflux step due to the presence of residual acid.

The result is a non-aggregated silyl-treated 75 nm colloidal silica-toluene mixture. The silica was characterized by cleaving off the silica silyl groups in the presence of tetraethyl orthosilicate (TEOS) and a strong base (i.e., "digestion" process). The amount and type of the surface silyl groups in the digested solution were quantified via gas chromatography and a flame ionization detector (GC-FID). Surface analysis of this silica-toluene mixture described a particle with 0.86 weight % of trimethyl silyl groups and 0.60 weight % of dimethylvinyl silyl groups. Based upon theoretical calculations, this treatment amount is approximated as 28659 trimethyl- and 17253 dimethylvinyl-silyl groups per particle and/or 1.62 trimethyl- and 0.98 dimethylvinyl-silyl groups per nm$^2$ of silica surface area. These values are representative of approximately 100% theoretical coverage of the silica surface silanol groups by silyl groups. The material was used as an additive for in silicone matrices to increase their mechanical properties (as shown in examples that follow).

Reference Example 4

75 nm colloidal silica treated with hexamethyl disiloxane (Me$_3$Si)$_2$O and dispersed in a xylene solution.

An amount of 388.1 ml of a 40% by weight colloidal silica solution [Nalco 2329®, diameter 75 nm; specific gravity, 1.29 g/ml; surface area, 40 m$^2$/gr] was mixed with 862 ml of deionized water to make a 1250 ml mixture. In a 5-liter flask, 500 ml concentrated HCl, 25.0 ml water, 600 ml isopropyl alcohol and 213.4 ml hexamethyldisiloxane, [(Me$_3$SiO)$_2$], were added and mixed well. To the resulted 1338 ml solution, the colloidal silica-water mixture was added as a fine stream with good mixing. The mixture was heated to 70° C. and then was allowed to stir for 30 min. As the hydrophilic silica became hydrophobic due to the silylation of silica surface silanols, the silica phase separated from the aqueous phase. No excess organic solvent was required to induce phase separation, as is often the case. Once separation occurred, the aqueous layer (isopropyl alcohol, water, excess treating agent and HCl) was decanted. An amount of 500 ml deionized water was added into the flask to wash the treated silica and was decanted. This step was repeated a second time to insure adequate washing. To the washed silica solution, approximately 1250 ml xylene were added, a Dean Stark trap and condenser were attached and the mixture heated to reflux to azeotrope residual water and water-soluble reagents. The washing step is utilized to remove as much of the HCl, IPA, water, and excess treating agent as possible, thereby shortening the time necessary for this reflux/azeotroping step. This removal also minimizes the potential for any side reactions that may occur during this reflux step due to the presence of residual acid.

The result is a non-aggregated silyl-treated 75 nm colloidal silica-xylene mixture. The silica was characterized by cleaving off the silica silyl groups in the presence of tetraethyl orthosilicate (TEOS) and a strong base (i.e., "digestion" process). The amount and type of the surface silyl groups in the digested solution were quantified via gas chromatography and a flame ionization detector (GC-FID). Surface analysis of this silica-xylene mixture described a particle with 1.05 weight % of trimethyl silyl groups. Based upon theoretical calculations, this treatment amount is approximated as 34813 trimethyl silyl groups per particle and/or 1.97 trimethyl silyl groups per nm$^2$ of silica surface area. This is representative of approximately 83% theoretical coverage of the silica surface silanols by silyl groups. The material was used as an additive for in silicone matrices to increase their mechanical properties (as shown in examples that follow).

Reference Example 5

75 nm colloidal silica treated with hexamethyl disiloxane (Me$_3$Si)$_2$O and low levels of tetramethyldivinyl disiloxanes (Me$_2$ViSi)$_2$O and dispersed in xylene solution.

An amount of 388.1 ml of a 40% by weight colloidal silica solution [Nalco 2329®, diameter 75 nm; specific gravity, 1.29 g/ml; surface area, 40 m$^2$/gr] was mixed with 862 ml of deionized water to make a 1250 ml mixture. In a 5-liter flask, 500 ml concentrated HCl, 25.0 ml water, 600 ml isopropyl alcohol and 177.8 ml hexamethyldisiloxane, [(Me$_3$Si)$_2$O], and 38.3 ml tetramethyldivinyldisiloxane [(Me$_2$ViSi)$_2$O] were added and mixed well. The mole ratio of tetramethyldivinyldisiloxane, [(Me$_2$ViSi)$_2$O], to hexamethyldisiloxane, [(Me$_3$Si)$_2$O], was 0.2. To the resulted 1341 ml solution, the colloidal silica-water mixture was added as a fine stream with good mixing. The mixture was heated to 70° C. and then was allowed to stir for 30 min. As the hydrophilic silica became hydrophobic due to the silylation of silica surface silanols, the silica phase separated from the aqueous phase. No excess organic solvent was required to induce phase separation, as is often the case. Once separation occurred, the aqueous layer (isopropyl alcohol, water, excess treating agent and HCl) was decanted. An amount of 500 ml deionized water was added into the flask to wash the treated silica and was decanted off. This step was repeated a second time to insure adequate washing. To the washed silica solution, approximately 1250 ml xylene were added, a Dean Stark trap and condenser were attached and the mixture heated to reflux to azeotrope residual water and water-soluble reagents. The washing step is utilized to remove as much of the HCl, IPA, water, and excess treating agent as possible, thereby shortening the time necessary for this reflux/azeotroping step. This removal also minimizes the potential for any side reactions that may occur during this reflux step due to the presence of residual acid.

The result is a non-aggregated silyl-treated 75 nm colloidal silica-xylene mixture. The silica was characterized by cleaving off the silica silyl groups in the presence of tetraethyl orthosilicate (TEOS) and a strong base (i.e., "digestion" process). The amount and type of the surface silyl groups in the digested solution were quantified via gas chromatography and a flame ionization detector (GC-FID). Surface analysis of this silica-toluene mixture described a particle with 0.81 weight % of trimethyl silyl groups and 0.14 weight % of dimethylvinyl silyl groups. Based upon theoretical calculations, this treatment amount is approximated as 26910 trimethyl- and 4052 dimethylvinyl-silyl groups per particle and/or 1.52 trimethyl- and 0.23 dimethylvinyl-silyl groups per nm$^2$ of silica surface area. These values are representative of approximately 98% theoretical coverage of the silica surface silanol groups by silyl groups. The material was used as an additive for in silicone matrices to increase their mechanical properties (as shown in examples that follow).

Reference Example 6

75 nm colloidal silica treated with hexamethyl disiloxane (Me$_3$Si)$_2$O and high levels of tetramethyldivinyl disiloxanes (Me$_2$ViSi)$_2$O and dispersed in xylene solution.

An amount of 388.1 ml of a 40% by weight colloidal silica solution [Nalco 2329, diameter 75 nm; specific gravity, 1.29 g/ml; surface area, 40 m$^2$/gr] was mixed with 862 ml of deionized water to make a 1250 ml mixture. In a 5-liter flask, 500 ml concentrated HCl, 25.0 ml water, 600 ml isopropyl alcohol and 112.3 ml hexamethyldisiloxane, [(Me$_3$Si)$_2$O], and 108.9 ml tetramethyldivinyldisiloxane [(Me$_2$ViSi)$_2$O] were added and mixed well. The mole ratio of tetramethyldivinyldisiloxane, [(Me$_2$ViSi)$_2$O], to hexamethyldisiloxane, [(Me$_3$Si)$_2$O], was 0.9. To the resulted 1345 ml solution, the colloidal silica-water mixture was added as a fine stream with good mixing. The mixture was heated to 70° C. and then was allowed to stir for 30 min. As the hydrophilic silica became hydrophobic due to the silylation of silica surface silanols, the silica phase separated from the aqueous phase. No excess organic solvent was required to induce phase separation, as is often the case. Once separation occurred, the aqueous layer (isopropyl alcohol, water, excess treating agent and HCl) was decanted. An amount of 500 ml deionized water was added into the flask to wash the treated silica and was decanted off. This step was repeated a second time to insure adequate washing. To the washed silica solution, approximately 1250 ml xylene were added, a Dean Stark trap and condenser were attached and the mixture heated to reflux to azeotrope residual water and water-soluble reagents. The washing step is utilized to remove as much of the HCl, IPA, water, and excess treating agent as possible, thereby shortening the time necessary for this reflux/azeotroping step. This removal also minimizes the potential for any side reactions that may occur during this reflux step due to the presence of residual acid.

The result is a non-aggregated silyl-treated 75 nm colloidal silica-toluene mixture. The silica was characterized by cleaving off the silica silyl groups in the presence of tetraethyl orthosilicate (TEOS) and a strong base (i.e., "digestion" process). The amount and type of the surface silyl groups in the digested solution were quantified via gas chromatography and a flame ionization. detector (GC-FID). Surface analysis of this silica-toluene mixture described a particle with 0.45 weight % of trimethyl silyl groups and 0.37 weight % of dimethylvinyl silyl groups. Based upon theoretical calculations, this treatment amount is approximated as 15077 trimethyl- and 10719 dimethylvinyl-silyl groups per particle and/or 0.86 trimethyl- and 0.61 dimethylvinyl-silyl groups per nm$^2$ of silica surface area. These values are representative of approximately 100% theoretical coverage of the silica surface silanol groups by silyl groups. The material was used as an additive for in silicone matrices to increase their mechanical properties (as shown in examples that follow).

Testing Example 1

Three Point Flexural Testing

The three point bending test was performed on an Instron 4500 per ASTM standard D 790-961. The cured resin specimens prepared in the Examples described below were cut into 5.08 cm×1.27 cm specimens using a band saw. The specimens were then machined to a thickness of 0.25 cm. The specimens were tested using a cross head speed of 1 mm/min and a support span of 3.81 cm.

During testing, force-displacement curves were recorded. The toughness of the cured resin was obtained as the area under the stress-strain curves. The flexural strength was calculated using the peak force as:

$S=3PL/2bd^2$ where S is the stress in the outer surface at the mid span, P the maximum load, L the support span, and b and d are the width and thickness of the beam. The maximum strain was calculated, using the maximum displacement, as:

$\in=6Dd/L^2$ where $\in$ is the strain at break and D is the maximum displacement. The slope of the steepest initial straight-line portion of the load-displacement curve was taken as the Young's modulus.

Testing Example 2
Fracture Toughness Testing

The plane strain fracture toughness, $K_{Ic}$, was obtained per ASTM D 5045-96, and the critical strain energy release rate, $G_{Ic}$, was calculated from $K_{Ic}$ based on Linear Elastic Fracture Mechanics (LEFM) assumptions. 5.08 cm×0.95 cm samples were cut using a band saw and a notch was cut at the center of the specimen. A natural crack extending from the root of the notch to about half of the width was produced by gently tapping a sharp razor blade into the notch. Samples were conditioned at 73° C. for at least twenty-four hours before testing to allow full relaxation of deformation. The displacement rate of the test was 10 mm/minute with a support span of 3.81 cm.

$$K_{Ic}=(P/(BW^{1/2}))f(x)$$

where P is the highest load and:

$$f(x)=6x^{1/2}(1.99-x(1-x)(2.15-3.93x+2.7x^2))/((1+2x)(1-x)^{3/2})$$

where x is the pre-crack to specimen width ratio, a/W. After the test the pre-crack length was measured. Only those specimens with a value between 0.45 to 0.55 were considered valid. The variation of x across the thickness should be less than 10%. The validity of the test was further ensured by. comparing the sample dimensions with the estimated plastic zone size enlarged by approximately 50:

$$B,a,(W-a)>2.5(K_{Ic}/\gamma_y)^2$$

where $\gamma_y$ is the yield stress of the sample.

$G_{Ic}$ was calculated by:

$$G_{Ic}=K^2_{Ic}(1-v^2)/E$$

where upsilon, the Poisson's ratio of the resin, was neglected to simplify the experiment. For a glassy polymer with a Poisson's ratio of 0.3, $G_{Ic}$ was exaggerated by about 9%. However, the relative ranking of $G_{Ic}$ values would not be obscured since the change of the square of the Poisson's ratio is usually small from one resin to another of similar stiffness.

Testing Example 3
Dynamic Mechanical Analysis

Dynamic mechanical analysis was carried out on a Seiko Dynamic Mechanical Rheology Station DMS 200. A specimen 20 mm long, 4 mm wide and 1 mm thick was mounted in two grips 14 mm apart. The specimen was then subjected to a sinusoidal tensile displacement at a frequency of 1 Hertz. The tension was measured and the storage and loss moduli and the loss factor were calculated. The tests were performed at temperatures ranging from −150 to 350° C. All tests were performed in a nitrogen environment with a gas flow rate of 200 ml/min.

Preparation Example 1

The silsesquioxane resin $(PhSiO_{3/2})_{0.75}(ViMe_2SiO_{1/2})_{0.25}$ was crosslinked by 1,4-bis(dimethylsilyl)benzene (referred to as silphenylene). The colloidal silica used in this set of examples is an aqueous dispersion of colloidal silica of 75 nm in diameter. 10 and 20 wt. % of colloidal silica was incorporated into the resin matrix to investigate the effect on mechanical properties. Three types of surfaces treatments are used: 0, 0.2 and 0.6 wt. % $ViMe_2SiO_{1/2}$ on the surface of these nano particles. Mechanical properties of these samples are included in Table 1, along with results for some sample of the same resin cured by a different set of crosslinkers. Generally the fracture toughness of the resin was significantly increased by the incorporation of the colloidal silica particles. The Young's modulus of the resin was also increased but the extent of the increase depended on the surface treatment. A higher modulus was obtained with the colloidal silica with less vinyl in the system. Generally Tg was lowered slightly by the incorporation of these particles. It is suspected that the residual surface treatment agent, tetramethyldivinyl disiloxane, has lowered the Tg and resulted in the modulus dependence on the surface treatment. $^{29}Si$ NMR analysis confirmed the existence of residual, unreacted surface treatment agent in the dispersion.

Preparation Example 2

In the previous examples it was reported that colloidal silica dispersed in toluene, when incorporated into the above-mentioned resin, significantly lowered the glass transition temperature while improving the fracture toughness. After identifying the cause of the lowering of the Tg, the spray-dried versions of the colloidal silica were used. The spray drying process generally includes providing a dispersion of silica in an organic solvent that is sprayed in a column with flowing hot air that evaporates the solvent and leaves the heavier silica. The $ViMe_2SiO_{1/2}/Me_3SiO_{1/2}$ ratios of the surface treatment on these spray-dried colloidal silica particles were 0, 0.2, and 0.9. Dynamic Mechanical Analysis of the resins showed that the glass transition temperature was increased by 7 to 11° C., depending on the surface treatment. The room temperature modulus was moderately increased. The strength, strain, and the fracture toughness varied strongly with the surface treatment. When vinyl functionality was present on the surface of these particles, the fracture toughness of the resin was well retained (1.08 $MPam^{1/2}$ for the unfilled vs. 0.97 and 0.90 for the silica filled) while realizing the benefit of a moderate increase in modulus and Tg. When no vinyl functionality was present on the surface the fracture toughness was decreased from 1.08 $MPam^{1/2}$ to 0.39 $MPam^{1/2}$. The mixing of spray-dried colloidal silica and resins in these examples were performed in a Hauschild dental mixer and the mechanical properties are shown in Table 2 as the first three rows.

In the previous two sets of examples: it was reported that the incorporation of colloidal silica into a silphenylene crosslinked resin of $[(PhSiO_{3/2})_{0.75}(ViMe_2SiO_{1/2})_{0.25}]$ effectively increased the fracture toughness and modulus of the resin but the tetramethyldivinyl disiloxane impurity lowered the glass transition temperature. Subsequently spray-dried, vinyl surface treated colloidal silica particles with the disiloxane impurity removed were us ed to obtain higher modulus, Tg, and slightly reduced CTE with the fracture toughness maintained. However when a Hauschild dental mixer was used the dispersion was not ideal and the strength, strain, and energy to break were substantially lowered. Therefore the effect of the state of dispersion on mechanical properties was investigated. A Ross rotor/stator mixer was used to obtain a higher shear force and achieve more effective break-up of silica particle agglomerations during mixing. The cured resin plates were more homogeneous by visual examination. The mechanical properties of them were measured and included in Table 2 as the last three rows of the table. Compared with the resins mixed with a Hauschild dental mixer, these samples exhibited consistently better mechanical properties: higher modulus, flexural strength, flexural strain, and more than doubled energy to break for every type of colloidal silica particle experimented. Moreover, when a Ross mixer was used, whether or not there was vinyl treatment grafted onto the colloidal particle surface became less important. When a reasonable dispersion is achieved using a rotor/stator mixer, simultaneous increases in fracture toughness, glass transition temperature, and modulus is achieved.

TABLE 1

Mechanical Properties of silphenylene cross-linked Resin filled with aqueous dispersion of colloidal silica (75 nm in diameter).

| Cross-linker | Amount of Colloidal Silica wt. % | Young's Modulus GPa | Flexural Strength MPa | Flexural Strain % | KIc MPam$^{1/2}$ | GIc N/m |
|---|---|---|---|---|---|---|
| Silphenylene | 0 | 1.49 | 47.49 | 12.14 | 1.08 | 788.4 |
| Silphenylene | 10 | 1.68 | 38.26 | 5.05 | 1.48 | 1300 |
| Silphenylene | 20 | 1.90 | 41.91 | 5.05 | 1.74 | 1599 |
| DP37* | 0 | 1.39 | 41.36 | 5.94 | 0.47 | 155 |
| DP37 | 20 | 1.92 | 45.70 | 3.65 | 0.92 | 441 |

*30% (mole) hexamethyl trisiloxane and 70% (mole) diphenyl Silane, Silphenylene stands for 1,4-bis(dimethylsilyl) benzene

TABLE 2

Mechanical Properties of Spray-Dried Colloidal Silica Filled, Silphenylene Crosslinked Resin.

| Sample | Surface Vi/Si/MeSi ratio | Young's modulus (GPa) | Flexural Strength (MPa) | Flexural Strain (%) | Energy to Break (KJ/m$^3$) | $K_{Ic}$ (MPam$^{1/2}$) | $G_{Ic}$ (N/m) |
|---|---|---|---|---|---|---|---|
| 1 | 0 | 1.72 ± 0.13 | 33.0 ± 14.7 | 3.98 ± 2.08 | 94.4 ± 98.8 | 0.393 ± 0.035 | 90.2 ± 15.8 |
| 2 | 0.2 | 1.60 ± 0.03 | 37.6 ± 2.1 | 4.22 ± 0.75 | 91.0 ± 25.4 | 0.976 | 595.8 |
| 3 | 0.9 | 1.60 ± 0.15 | 38.6 ± 6.0 | 4.33 ± 0.87 | 100.6 ± 31.3 | 0.909 | 516.2 |
| 4 | 0 | 1.84 ± 0.03 | 49.2 ± 0.3 | 7.69 ± 0.22 | 312.6 ± 10.2 | 0.556 ± 0.176 | 180.6 ± 108.7 |
| 5 | 0.2 | 1.78 ± 0.04 | 46.0 ± 3.0 | 6.30 ± 1.45 | 225.0 ± 80.5 | 1.130 ± 0.142 | 724.9 ± 175.3 |
| 6 | 0.9 | 1.80 ± 0.07 | 46.9 ± 2.1 | 6.27 ± 1.70 | 222.4 ± 97.8 | 1.183 ± 0.037 | 777.8 ± 48.2 |
| 7 | Unfilled | 1.49 ± 0.01 | 47.5 ± 0.5 | 12.14 ± 1.16 | | 1.083 ± 0.078 | 788.4 ± 113.0 |

All samples have the same resin matrix: (PhSiO$_{3/2}$)$_{0.75}$(ViMe$_2$SiO$_{1/2}$)$_{0.25}$, crosslinked by 1,4-bis(dimethylsilyl) benzene; and all of them have 20 wt. % colloidal silica incorporated except the unfilled for purpose of comparison. 1,2,3 are samples mixed by a Hauschild dental mixer, and 4,5,6,7 are samples mixed by a Ross rotor/stator mixer.

The cured silsesquioxane resin incorporating the colloidal silica prepared by the procedure outlined above and mixed with the Ross rotor/stator mixer has superior mechanical properties over those of conventional silsesquioxane resins. Typically, the cured silsesquioxane resin produced has: a fracture toughness value of 1.74 MPam$^{1/2}$ and a fracture energy of 1599 N/m as compared to the resin without the incorporation of colloidal silica which has a fracture toughness of 1.08 MPam$^{1/2}$ and a fracture energy of 788 N/m.

While a preferred embodiment is disclosed, a worker in this art would understand that various modifications would come within the scope of the invention. Thus, the following claims should be studied to determine the true scope and content of this invention.

What is claimed is:

1. A hydrosilylation reaction curable composition comprising:
   a) a silsesquioxane polymer
   b) a cross-linking compound;
   c) a hydrosilylation reaction catalyst;
   d) Colloidal silica having a surface coating formed thereon.

2. The hydrosilylation reaction curable composition of claim 1 further including an optional reaction inhibitor.

3. The hydrosilylation reaction curable composition of claim 1 wherein the silsesquioxane resin comprises a copolymer resin.

4. The hydrosilylation reaction curable composition of claim 3 wherein the copolymer resin comprises, a copolymer resin having the empirical formula $R^1_aR^2_bR^3_c SiO_{(4-a-b-c)/2}$, wherein: a is zero or a positive number, b is zero or a positive number, c is zero or a positive number, with the provisos that $0.8 \leq (a+b+c) \leq 3.0$ and component (A) has an average of at least 2 $R^1$ groups per molecule, and each $R^1$ is independently selected from monovalent hydrocarbon groups having aliphatic unsaturation, and each $R^2$ and each $R^3$ are independently selected from monovalent hydrocarbon groups and hydrogen.

5. The hydrosilylation reaction curable composition of claim 4 wherein the silsesquioxane resin comprises (PhSiO$_{3/2}$)$_{0.75}$(ViMe$_2$SiO$_{1/2}$)$_{0.25}$, where Ph is a phenyl group, Vi represents a vinyl group, and Me represents a methyl group.

6. The hydrosilylation reaction curable composition of claim 1 wherein the cross-linking compound is selected from the group consisting of: 1) a silicon hydride containing hydrocarbon having the general formula: $H_aR^1_bSiR^2SiR^1_cH_d$ where $R^1$ is a monovalent hydrocarbon group and $R^2$ is a divalent hydrocarbon group and where a and $d \geq 1$, and a+b=c+d=3, 2) a silicon hydride containing hydrocarbon having the general formula: $H_aR^1_bSiR^2SiR^1_cH_d$ where $R^1$ is a monovalent hydrocarbon group and $R^2$ is a trivalent hydrocarbon group and where a and $d \geq 1$, and a+b=c+d=3, 3) a silane having at least two silicon hydride functionalities, 4) a siloxane having at least two silicon hydride functionalities, or mixtures of the above.

7. The hydrosilylation reaction curable composition of claim 6 wherein the cross-linking compound is selected from the group consisting of: p-bis(dimethylsilyl)benzene, diphenylsilane, hexamethyltrisiloxane, and 1,3,5 trisdimethylsilylbenzene.

8. The hydrosilylation reaction curable composition of claim 1 wherein the colloidal silica comprises from 5 to 25 weight percent of the hydrosilylation reaction curable composition.

9. The hydrosilylation reaction curable composition of claim 1 wherein the colloidal silica has a particle size of from 5 to 100 nanometers in diameter.

10. The hydrosilylation reaction curable composition of claim 1 wherein the colloidal silica has a reactive silane or siloxane coating.

11. The hydrosilylation reaction curable composition of claim 1 wherein the colloidal silica has a surface coating of trimethylsiloxy groups.

12. The hydrosilylation reaction curable composition of claim 1 wherein the colloidal silica has a surface coating of trimethylsiloxy and vinyldimethylsiloxy groups.

13. The hydrosilylation reaction curable composition of claim 12 wherein the surface coating has a molar ratio of from 0.2 to 0.9 of vinyldimethylsiloxy to trimethylsiloxy groups.

14. The hydrosilylation reaction curable composition of claim 1 wherein the colloidal silica is dispersed in a solvent.

15. The hydrosilylation reaction curable composition of claim 14 wherein the solvent is selected from the group consisting of toluene and xylene.

16. A process for preparing a hydrosilyation reaction curable composition comprising the steps of:
   a) providing a silsesquioxane polymer;
   b) providing a cross-linking compound;
   c) providing colloidal silica with a surface treatment formed thereon;
   d) mixing the components of a), b), c) to form a curable composition;
   e) adding a hydrosilylation reaction catalyst to the curable composition of step d)
   f) curing the curable composition of step e) to form a cured resin having high fracture toughness and strength without the loss of elastic modulus and glass transition temperature.

17. The process of claim 16 wherein the step of mixing is performed in a conventional mixer.

18. The process of claim 16 wherein the step of mixing is performed in a high shear rotor/stator mixer.

19. The process of claim 16 wherein the silsesquioxane polymer is first mixed with the cross-linking compound and then mixed with the colloidal silica to form the curable composition of step e).

20. The process of claim 16 wherein the curing step includes the steps of: 1) leaving the curable composition of step e) in a mold at room temperature overnight, 2) curing the curable composition in the mold at a temperature of 60° C. for 6 hours, 3) curing the curable composition in the mold at a temperature of 100° C. for 2 hours, 4) curing the curable composition in the mold at a temperature of 160° C. for 2 hours, 5) curing the curable composition in the mold at a temperature of 200° C. for 3 hours, 6) curing the curable composition in the mold at a temperature of 260° C. for 6 hours.

21. The process of claim 16 wherein the silsesquioxane resin comprises a copolymer resin.

22. The process of claim 21 wherein the copolymer resin comprises, a copolymer resin having the empirical formula $R^1_a R^2_b R^3_c SiO_{(4-a-b-c)/2}$, wherein: a is zero or a positive number, b is zero or a positive number, c is zero or a positive number, with the provisos that $0.8 \leq (a+b+c) \leq 3.0$ and component (A) has an average of at least 2 $R^1$ groups per molecule, and each $R^1$ is independently selected from monovalent hydrocarbon groups having aliphatic unsaturation, and each $R^2$ and each $R^3$ independently selected monovalent hydrocarbon groups and hydrogen.

23. The process of claim 22 wherein the silsesquioxane resin comprises $(PhSiO_{3/2})_{0.75}(ViMe_2SiO_{1/2})_{0.25}$, where Ph is a phenyl group, Vi represents a vinyl group, and Me represents a methyl group.

24. The process of claim 1 wherein the cross-linking compound is selected from the group consisting of: 1) a silicon hydride containing hydrocarbon having the general formula: $H_a R^1_b SiR^2 SiR^1_c H_d$ where $R^1$ is a monovalent hydrocarbon group and $R^2$ is a divalent hydrocarbon group and where a and $d \geq 1$, and a+b=c+d=3, 2) a silicon hydride containing hydrocarbon having the general formula: $H_a R^1_b SiR^2 SiR^1_c H_d$ where $R^1$ is a monovalent hydrocarbon group and $R^2$ is a trivalent hydrocarbon group and where a and $d \geq 1$, and a+b=c+d=3, 3) a silane having at least two silicon hydride functionalities, 4) a siloxane having at least two silicon hydride functionalities, or mixtures of the above.

25. The process of claim 24 wherein the cross-linking resin is selected from the group consisting of: p-bis (dimethylsilyl)benzene diphenylsilane, hexamethyltrisiloxane, and 1,3,5 trisdimethylsilylbenzene.

26. The process of claim 16 wherein the colloidal silica comprises from 5 to 25 weight percent of the hydrosilylation reaction curable composition.

27. The process of claim 16 wherein the colloidal silica has a particle size of from 5 to 100 nanometers in diameter.

28. The process of claim 16 wherein the colloidal silica has a surface coating of trimethylsiloxy groups.

29. The process of claim 16 wherein the colloidal silica has a surface coating of trimethylsiloxy and vinyldimethylsiloxy groups.

30. The process of claim 29 wherein the surface coating has a molar ratio of from 0.2 to 0.9 of vinyldimethylsiloxy to trimethylsiloxy groups.

31. The process of claim 16 wherein the colloidal silica is dispersed in a solvent.

32. The process of claim 31 wherein the solvent is selected from the group consisting of toluene and xylene.

33. The process of claim 16 further including the step of adding an optional reaction inhibitor.

* * * * *

UNITED STATES PATENT AND TRADEMARK OFFICE
CERTIFICATE OF CORRECTION

PATENT NO. : 6,646,039 B2 Page 1 of 1
DATED : November 11, 2003
INVENTOR(S) : Li et al.

It is certified that error appears in the above-identified patent and that said Letters Patent is hereby corrected as shown below:

<u>Title page,</u>
Item [73], Assignee, add -- Massachusetts Institute of Technology, Cambridge, MA (US) --

Signed and Sealed this

Fifteenth Day of June, 2004

JON W. DUDAS
*Acting Director of the United States Patent and Trademark Office*